Jan. 7, 1936.　　　　　G. A. COOPER　　　　　2,027,152
METHOD AND APPARATUS FOR CONVERTING SOLID ARTICLES INTO TUBULAR STRUCTURES
Filed Oct. 8, 1932　　　2 Sheets-Sheet 2

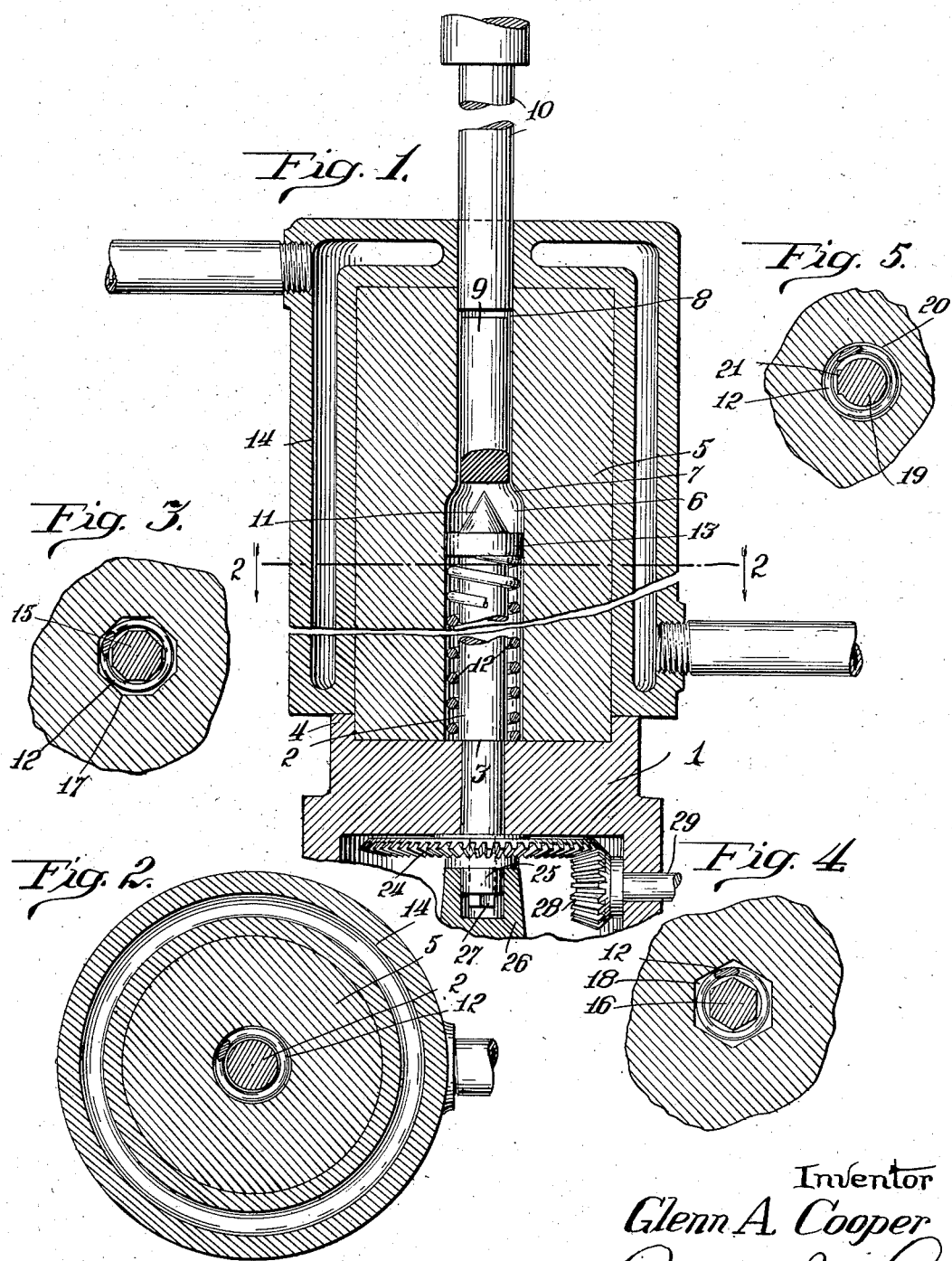

Inventor
Glenn A. Cooper
By Rudolph M. Lotz
Attorney

Patented Jan. 7, 1936

2,027,152

UNITED STATES PATENT OFFICE 2,027,152

METHOD AND APPARATUS FOR CONVERTING SOLID ARTICLES INTO TUBULAR STRUCTURES

Glenn A. Cooper, Chicago, Ill., assignor to Cruver Manufacturing Company, Chicago, Ill., a corporation of Illinois Application October 8, 1932, Serial No. 636,834

13 Claims. (Cl. 18—3)

This invention relates to a method and apparatus for converting solid rods of material of a type which will soften and become plastic under the influence of heat, into tubular structures without changing characteristics.

The invention is designed, particularly, to convert rods or slugs of pyroxylin into tubular structures such as fountain pen barrels and caps, mechanical pencil barrels, thermometer cases, syringes, and the like, but is applicable to other materials than pyroxylin, such as hard rubber.

In the manufacture of tubular structures from rods of pyroxylin, and particularly that type of pyrolin which presents a mottled multi-colored appearance, the present practice consists in first forming a cake of the material. Said cake is then cut into rods and the latter are then cut to cylindrical or other external shape.

These shaped rods are then drilled to convert them into tubular structures and are reshaped, externally, to the extent necessary to receive component parts of the ultimate finished articles.

The drilling of the rods occasions substantially complete waste of approximately sixty per cent of the material, especially of the aforesaid mottled pyroxylin, for the reason that the shavings cannot be melted to produce mottled material as the several colors run together and produce a solid colored product of a much smaller value than the original product.

The object of the present invention is, therefore, to provide a method and apparatus of the kind specified which will eliminate the waste incident to drilling as aforesaid, and which will convert solid slugs of the material into tubular structures of any desired external and internal shapes at far less cost than the present methods involve.

A further object of the invention is to provide an apparatus of the type specified which will produce substantially polished products requiring little or no buffing or further polishing.

A suitable apparatus embodying the invention insofar as it relates thereto and which is adapted for carrying the method of this invention, is illustrated in the accompanying drawings, wherein:

Fig. 1 is a central longitudinal sectional view of a die and mould constructed in accordance with the invention.

Fig. 2 is a plan section of the same on the line 2—2 of Fig. 1.

Figs. 3, 4 and 5, are fragmentary plan sections of modified shapes of die-moulds adapted for productions of tubular structures of various cross-sectional shapes.

Figs. 6 to 9 inclusive, are fragmentary longitudinal sectional views showing plungers of different shapes and resultant finished products.

Figs. 10 to 13 inclusive, are side elevations showing finished articles of various shapes produced in accordance with this invention.

Figure 14:
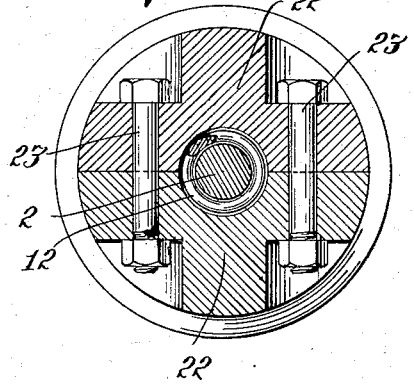

Fig. 14 is a plan section showing the type of mold required for the production of the type of articles shown in Figs. 10 to 13 inclusive.

Figure 6:
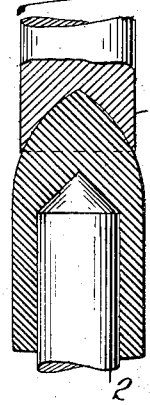
Figure 7:
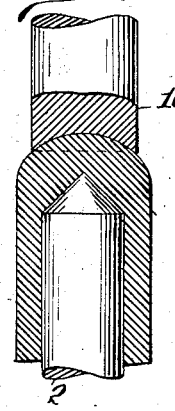
Figure 8:
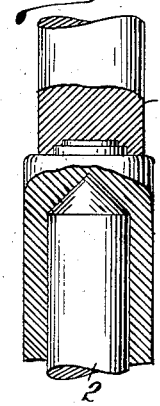
Figure 9:
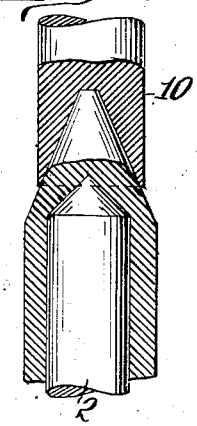
Figure 15:
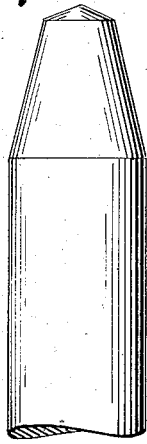
Figure 16:

Figs. 15 and 16 are fragmentary side elevations showing tubular structures produced in accordance with the invention.

In order that the method of this invention may be readily comprehended, the apparatus for carrying out the same, as herein illustrated, will be first described in connection with the initial steps of the said method.

The said apparatus, as shown in Figs. 1 and 2, comprises a base-block 1 have a central socket in which the lower end portion of the mandrel 2 is received and firmly, but removably held. The said lower end portion of the said mandrel 2 is of slightly smaller diameter than the upper portion thereof and terminates at the annular shoulder 3 which rests upon the base-block 1.

The said base-block 1 is also provided with an annular flange 4 within which the mold-block 5 is snugly telescopically received at its lower end. This flange facilitates the alignment of the mandrel in chamber 6.

The said mandrel 2 may be termed the male die member and the said block 5 may be termed the female die member which is provided with a central chamber 6 of larger diameter than said mandrel 2. This chamber receives the upper end portion of the said mandrel.

The chamber 6 is gradually contracted at its upper end portion, as at 7, to meet the lower end portion of an upper chamber 8 which, in the instance illustrated in Figs. 1 and 2, is cylindrical but may be of any other desired shape in cross-section. This chamber 8 receives a section 9 of rod of the material to be rendered tubular and also receives the plunger 10 of a suitable press or the like for exerting pressure on the rod or slug 9.

The upper terminal portion 11 of the mandrel contained within the chamber 6 is shown as being conical, but may be of any other suitable and desired shape so long as it does not choke the tapered portion 7 to such an extent as will leave an annular space around said terminal end of smaller area than that of the annular space between the body portion of the mandrel 2 and the surrounding wall of the chamber 6.

A compression spring 12 is disposed in the last-mentioned annular space and supports a sliding sleeve 13 normally in a position wherein the upper end of the said sleeve 13 is disposed flush with or slightly lower than the base of the portion 11 of the mandrel.

A steam or hot-water jacket 14, is provided preferably for the block or female member 5 for maintaining the same at a substantially uniform temperature, during forming operation, but which may be used as a cooling agent by the letting in of cold water after the operation of forming has been completed.

In Figs. 1 and 2, the chamber 6 and the mandrel 2 are shown as being cylindrical and concentrically disposed and in Figs. 3 and 4, this concentric disposition is maintained, but the mandrels 15 and 16 and the chambers 17 and 18, respectively, are shown as polygonal in cross-section, it being obvious that the said chambers may be polygonal and cylindrical mandrels 2 substituted for the polygonal mandrels 15 and 16, and vice versa.

In Fig. 5, a different relation of mandrel 19 and chamber 20 is illustrated wherein the said mandrel is disposed eccentrically of the chamber 20. In this Figure, the mandrel 19 is also shown as being provided with a flat-faced projecting rib 21 extending into the portion of the space between said mandrel and the said chamber which is of greatest width.

The said spring 12 constitutes a resistant to the travel of the sleeve 13 upon the mandrel 2 responsively to pressure exerted upon the upper end of said sleeve for reasons hereinafter set forth.

The apparatus hereinabove described is capable of being modified in construction to adapt it for forming tubular structures which vary in cross-sectional dimensions at different points longitudinally thereof as is shown particularly in Figs. 10 to 13 inclusive. The walls of the chamber 6 or the equivalents thereof shown in Fig. 3, Fig. 4 and Fig. 5, are preferably highly polished so that the articles produced therein will present substantially polished surfaces requiring little or no buffing or further polishing.

In the production of tubular articles of shapes of a type exemplified in Figs. 10 to 13, inclusive, a split mold such as is shown in Fig. 14 must be employed as otherwise the finished articles cannot be removed.

The mold of Fig. 14 comprises two equal sections 22 which are secured together by means of bolts 23. In all other respects the said mold of Fig. 14 may be identical with that shown in Figs. 1 and 2.

In practice it has been found preferable to impart relative rotation to the member 5 and the mandrel 2 during the period of the pressure stroke of the plunger 10. To accomplish this, it will be necessary, of course, that either the chamber 6 or the mandrel 2 shall present a smooth surface which is concentric throughout with the axis of rotation of the rotable member. To rotate the mandrel 2 is preferable and to this end the base-block of the mold is provided with a chamber in which a bevel gear wheel 24 is received. The latter has its hub 25 disposed in a bearing 26 rigid with the base block.

The said gear wheel 24 and hub 25 are provided with a square opening to receive the square lower end portion 27 of the mandrel 2.

The bevel gear wheel 24 meshes with the bevel pinion 28 mounted on the shaft 29 journalled in a bearing in the annular wall of the chamber within the said base block, said shaft being rotatable manually or by associating the same with a source of power.

The method of this invention may be briefly and broadly defined as consisting in first heating a slug of the material which is to be converted into a tubular structure, to the degree required to render it sufficiently soft or plastic to enable its shape to be changed without effecting fracture thereof but heating the same insufficiently to render it fluid to the degree which would cause the differently colored components thereof to commingle with each other. Said heated, plastic slug is then subjected to pressure to force it into a mold while it remains in the desired and requisite plastic condition, to cause it to completely fill the mold and acquire the form of the latter.

More specifically defined, the invention consists in forcing the plastic slug over a mandrel disposed within a mold chamber in order to reshape said slug by a progressive movement thereof to fill the mold from one end toward the other end thereof, preferably against the action of counterpressure for preventing uneven flow of the lower end portion of the reformed slug.

In the instance illustrated, the slug 9, heated to the desired degree, is placed in the chamber 8 and is then forced down upon the mandrel 2 and into the chamber 6 by means of the plunger 10 which causes the material of the slug to attain a larger diameter and to be elongated proportionately to the difference between its original cross-sectional area and the cross-sectional area of the annular chamber 6. During the downward travel of the slug 9, the material of the latter will flow from the lower end thereof progressively without appreciably changing its appearance because the components thereof of different colors, in the case of the mottled pyrolin hereinabove referred to, are not appreciably displaced from their original relative positions in the slug.

In the case of pyroxylin, the heating of the slug effected preferably by immersing the slug in hot water approximating a temperature of two hundred degrees Fahr. for a sufficiently long period to cause the whole slug to be of uniform temperature throughout.

The mold-block 5 is also heated, preferably, to the same or substantially the same temperature as the said chamber 8, and the plunger 10 is then forced down to force the slug 9 progressively continuously downward until the plunger 10 has its lower end disposed at the lower terminal of the chamber 8.

During the downward stroke of the said plunger, the mandrel will penetrate the slug and cause the material thereof to be displaced to fill completely the tapered portion 7 of the chamber 6 and then to cause the displaced material to move the sleeve 13 against the action of the spring 12 and fill the constantly elongating annular space between the mandrel 2 and the surrounding wall of the chamber 6 until the said plunger 10 has attained the lower limit of its movement.

The sleeve 13 serves to prevent the plastic material from flowing unevenly into the said annular chamber and the spring 12 exerts pressure counter to that of the plunger to cause the material to remain compacted during the above-described operation.

Preferably the mandrel 2 is maintained in rotation during the entire pressure stroke of the plunger 10 as this prevents flexing of the mandrel and promoted uniform flow of the material of the slug within the mold chamber. Rotation of the mandrel and the counterpressure exerted by the sleeve 10 co-operate to cause the finished article to be of uniform density throughout.

After the plunger (10) has completed its pressure stroke, the mold may be chilled in any suitable manner and is then removed from the base block (2), whereupon by further operation of the plunger (10), the resulting molded article will be forced from the mold chamber.

The completed hollow or tubular structure is removed by removing the mold 5 from the base block and then withdrawing the mandrel 2 and ejecting the molded article by means of the plunger 10. The said molded article is then chilled further in any suitable manner and, in the case of pyroxylin, is also cured in the customary manner.

While the invention is designed particularly for converting solid slugs of pyroxylin into tubular structures, it will be understood, of course, that other materials which are rendered plastic by heat or by subjection to solvents, or both, may be used without departing from the invention as defined in the appended claims.

It will also be obvious that the invention comprehends the conversion of a tubular structure of materials of the type indicated, of small diameter and having a relatively thick circumferential wall, into tubular structures of the same or larger diameter and having thinner walls. Likewise, the invention comprehends the reshaping of a completed tubular structure of the type specified by subsequent subjection of the same to the action of pressure in molds adapted to produce the ultimate desired shapes, contours, and dimensions.

The apparatus herein illustrated and described should be regarded as merely exemplary of a structure of its general type and the drawings thereof regarded as more or less diagrammatic.

It will be noted that in carrying out the invention, the elongation of the slug, due to displacement of its core portion by the mandrel, is in the direction of travel of the slug, it having been found, by experiment, that if the slug is held against movement and it is attempted to force the mandrel into the slug, the desired result is not attainable. As shown and described, there must be a movement relatively between the whole mold and the slug and, therefore, it is most practical to impart the movement to the slug.

While it is preferred to force the slug into the mold-chamber by mechanical means, as hereinabove described, it will be obvious that any other means for imparting the requisite pressure to the slug may be employed.

Figure 17:
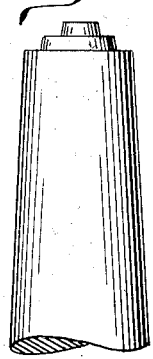
Figures 10, 11:
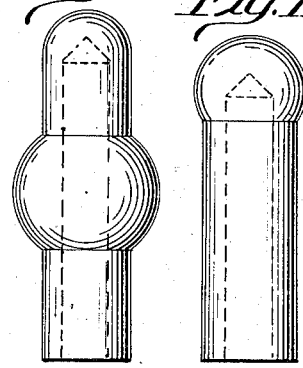
Figure 12:
Figure 13:
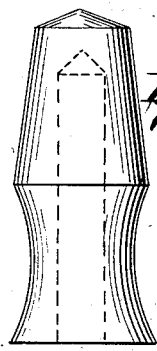

As is shown in Figs. 6 to 9 inclusive, the lower end of the plunger 10 may be shaped to impart fanciful contours or imprints to and upon the heads of the finished structures. This is further indicated in Figs. 10 to 13 inclusive, and in Figs. 15, 16 and 17.

It will be noted that the annular space around the conical end of the mandrel is of greater lateral dimensions than the space around the body of the mandrel. It is believed that the provision of a sharply pointed mandrel surrounded by this larger lateral space is important to the successful practice of the invention with respect to some materials in that the material of the slug is caused first to bulge to fill the said space and to be caused then to flow more readily into the lower portion of the cavity of the mold. This is found in practice, as carried out to date, to prevent fracture of the material.

I claim as my invention:

1. The hereindescribed method of forming tubular articles which consists in forcing a slug of a plastic material progressively into a mold chamber and over a mandrel disposed within said chamber, and imparting relative rotary movement to said mandrel and the mold during the interval of entry of the plastic substance into said mold chamber.

2. The hereindescribed method of forming hollow articles which consists in forcing a slug of plastic material progressively into a mold containing a mandrel, rotating said mandrel during the progressive movement of the slug, and imparting counterpressure to the forward end of said slug during its said progressive movement.

3. An apparatus for converting a slug of plastic material into a tubular structure which comprises a mold having a chamber adapted to receive the plastic slug, a mold chamber having direct unobstructed communication at one end with one end of the first-named chamber, a mandrel rigidly mounted in the second chamber and having a free end opposed to the mouth of the first chamber, a plunger reciprocable in the first chamber for forcing the slug into the second chamber and over the mandrel therein and a spring-held follower member constituting the bottom wall of the mold chamber for yieldingly resisting the entry of material into the latter and providing a shaping element for the lower end of the molded structure.

4. An apparatus for converting a slug of plastic material into a tubular structure which comprises a mold having a chamber adapted to receive the plastic slug, a mold chamber having direct unobstructed communication at one end with one end of the first-named chamber, a mandrel rigidly mounted in the second chamber and having a free end opposed to the mouth of the first chamber, there being an annular space in the second chamber around said mandrel, a plunger reciprocable in the first chamber for forcing the slug into the second chamber and over the mandrel therein, thereby to cause the material of said slug to fill the said annular space and a spring-held follower member constituting the bottom wall of the mold chamber for yieldingly resisting the entry of material into the latter and providing a shaping element for the lower end of the molded structure.

5. An apparatus for converting a slug of plastic material into a tubular structure which comprises a mold having a chamber adapted to receive the plastic slug, a mold chamber communicating at one end with one end of the first-named chamber, a mandrel rigidly mounted in the second chamber and having a free end opposed to the mouth of the first chamber, there being an annular space in the second chamber around said mandrel, a sleeve longitudinally reciprocable within and corresponding in cross-sectional shape and dimensions with said annular space, and a plunger reciprocable in the first chamber for forcing the slug into the second chamber and over the mandrel therein, thereby to cause the material of said slug to fill the said annular space and move said sleeve in one direction.

6. An apparatus for converting a slug of plastic material into a tubular structure which comprises a mold having a chamber adapted to receive the plastic slug, a mold chamber communicating at one end with one end of the first-named chamber, a mandrel rigidly mounted in the second chamber and having a free end opposed to the mouth of the first chamber, there being an annular space in the second chamber around said mandrel, a sleeve longitudinally reciprocable within and corresponding in cross-sectional shape and dimensions with said annular space, means for yieldingly maintaining said sleeve disposed upon the free end portion of said mandrel, and a plunger reciprocable in the first chamber for forcing the slug into the second chamber and over the mandrel therein, thereby to cause the material of said slug to fill the said annular space and move said sleeve in one direction against the action of the said means.

7. An apparatus for converting a slug of plastic material into a tubular structure which comprises a mold having a chamber adapted to receive the plastic slug, a mold chamber of larger lateral dimensions than the first-named chamber having direct unobstructed communication at one end with the latter, a mandrel rigidly mounted in said second chamber for providing an annular space around said mandrel, the free end of the latter being opposed to the mouth of the first chamber, a plunger reciprocable in the first chamber for forcing the slug into the second chamber and over the mandrel therein, a reciprocable member disposed in said annular space and constituting a movable bottom wall for the mold chamber for shaping the lower end of the molded structure and means for yieldably maintaining said member normally positioned near the intake end of said annular space.

8. An apparatus for converting a slug of plastic material into a tubular structure which comprises a mold having a chamber adapted to receive the plastic slug, a mold chamber of larger lateral dimensions than the first-named chamber having direct unobstructed communication one end with the latter, a mandrel rigidly mounted in said second chamber for providing an annular space around said mandrel, the free end of the latter being opposed to and spaced from the mouth of the first chamber, a plunger reciprocable in the first chamber for forcing the slug into the second chamber and over the mandrel therein, a reciprocable member mounted in said annular space and yieldingly held near the intake end of the latter for opposing entry of material into said chamber and effecting uniform flow of material into the same and shaping one end of the molded structure.

9. An apparatus for converting a slug of plastic material into a tubular structure which comprises a mold having a chamber adapted to receive the plastic slug, a mold chamber of larger lateral dimensions than the first-named chamber communicating at one end with the later, a mandrel rigidly mounted in said second chamber for providing an annular space around said mandrel, the free end of the latter being opposed to the mouth of the first chamber, a sleeve reciprocable upon said mandrel and spanning the said annular space, means for yieldingly maintaining said sleeve disposed upon the free end portion of the mandrel, and a plunger reciprocable in the first chamber for forcing the slug into the second chamber and over the mandrel therein against the resistance of the said sleeve.

10. An apparatus of the kind specified comprising a mold chamber open at end, a slug receiving chamber communicating at one end with said open end of said mold chamber, a mandrel within said mold chamber having a free end opposed to and spaced from the open end of said chamber, means for imparting relative rotation to the mold and the said mandrel, and means for forcing a plastic slug from said receiving chamber into the said mold-chamber and over the said mandrel.

11. An apparatus of the kind specified comprising a mold chamber open at one end, a slug receiving chamber communicating at one end with said open end of said mold chamber, a mandrel within said mold chamber having a free end opposed to and spaced from the open end of said chamber, means for imparting relative rotation to the mold and the said mandrel, and means for forcing a plastic slug from said receiving chamber into the said mold-chamber and over the said mandrel and means within the mold chamber for imparting counter-pressure to the first entering end of said slug.

12. An apparatus for converting a slug of plastic material presenting a surface pattern into a hollow article of different dimensions than said slug while maintaining the surface pattern substantially unchanged, comprising a chamber to receive and snugly house the slug, and from one end of which said slug is dischargeable bodily and without distortion, a mold chamber having unobstructed communication at one end with the discharge end of said receiving chamber, a rigid mandrel in said mold chamber axially aligned with and opposed at one end to the discharge end of said receiving chamber, there being a substantially annular space between the mandrel and the inner circumferential wall of the mold chamber, a ring-piston snugly fitting and reciprocable in said mold chamber, a spring for maintaining said piston normally disposed adjacent to the aforesaid end of said mandrel, and a plunger in the receiving chamber for forcing said slug over said mandrel into said mold chamber to fill the latter progressively against the action of the said piston.

13. An apparatus of the type specified comprising a mold consisting of a plastic slug receiving chamber corresponding substantially in cross-sectional shape and size with that of the slug, said chamber having an unobstructed discharge end, means in the other end portion for forcing the slug from the discharge end of said chamber, a mold chamber axially aligned with sad receiving chamber and having unobstructed communication at one end with the latter, said mold chamber presenting an annular space concentric with the receiving chamber and of maximum cross-sectional dimensions not materially different from the cross-sectional dimensions of the slug, and counterpressure means in said annular chamber opposed to the slug material forced into said mold chamber by said first-named means for maintaining uniform density of material in the mold chamber as the latter is filled progressively and effecting uniform flow of material during the mold filling operation.

GLENN A. COOPER.